US012765974B2

(12) United States Patent
Venanzoni et al.

(10) Patent No.: US 12,765,974 B2
(45) Date of Patent: Oct. 20, 2026

(54) DENTAL IMPLANT, SUPERSTRUCTURE, AND DENTAL PROTHESIS

(71) Applicant: TRI Dental Implants Int. AG, Huenenberg (CH)

(72) Inventors: Sandro Venanzoni, Zurich (CH); Rafael Perez, Freiburg (DE); Holger Kast, Huenenberg (CH); Ronald Jung, Herrliberg (CH)

(73) Assignee: TRI Dental Implants Int. AG, Huenenberg (CH)

( * ) Notice: Subject to any disclaimer, the term of this patent is extended or adjusted under 35 U.S.C. 154(b) by 80 days.

(21) Appl. No.: 18/904,266

(22) Filed: Oct. 2, 2024

(65) Prior Publication Data

US 2025/0017703 A1 Jan. 16, 2025

Related U.S. Application Data

(60) Division of application No. 17/874,889, filed on Jul. 27, 2022, now Pat. No. 12,383,381, which is a (Continued)

(30) Foreign Application Priority Data

Jan. 30, 2020 (DE) ..................... 10 2020 102 307.3

(51) Int. Cl.
*A61C 8/00* (2006.01)

(52) U.S. Cl.
CPC .......... *A61C 8/0075* (2013.01); *A61C 8/0022* (2013.01)

(58) Field of Classification Search
CPC ............................ A61C 8/0075; A61C 8/0022
See application file for complete search history.

(56) References Cited

U.S. PATENT DOCUMENTS 4,976,739 A * 12/1990 Duthie, Jr. ........... A61C 8/0022 606/60
5,302,126 A * 4/1994 Wimmer .............. A61C 8/0089 433/173

(Continued)

FOREIGN PATENT DOCUMENTS

CH 697838 B1 2/2009
DE 102018113237 A1 12/2019

(Continued)

OTHER PUBLICATIONS

International Search Report mailed May 26, 2021, in corresponding International Application No. PCT/EP2021/052030.

*Primary Examiner* — Nicholas D Lucchesi
(74) *Attorney, Agent, or Firm* — Harness, Dickey & Pierce, P.L.C.; Timothy J. Martin

(57) ABSTRACT

Dental implant and superstructure each with an interface that allows direct attachment of the superstructure to the dental implant without the use of an abutment. The dental implant comprises an anti-rotation element that is arranged in the opening and is configured to prevent the superstructure from rotating about a longitudinal axis relative to the dental implant. The superstructure comprises an interface corresponding to the anti-rotation element, having a recess with two mutually opposite side flanks which are at a first distance from each other in a first region and, in a second region which is at a greater distance from the longitudinal axis than the first region, are at a second distance from each other, the second distance being smaller than the first distance.

12 Claims, 4 Drawing Sheets

Related U.S. Application Data continuation of application No. PCT/EP2021/052030, filed on Jan. 28, 2021.

(56) References Cited

U.S. PATENT DOCUMENTS

| | | | | |
|---|---|---|---|---|
| 5,449,291 | A | 9/1995 | Lueschen et al. | |
| 6,663,388 | B1 * | 12/2003 | Schar | A61C 8/0069 433/173 |
| 6,733,292 | B2 * | 5/2004 | Odrich | A61C 8/005 433/173 |
| 7,160,109 | B2 * | 1/2007 | Gervais | A61C 8/0066 433/141 |
| 8,545,223 | B1 * | 10/2013 | Cherkinsky | A61C 8/0033 433/174 |
| 2003/0054318 | A1 * | 3/2003 | Gervais | A61C 8/0001 433/141 |
| 2005/0287497 | A1 * | 12/2005 | Carter | A61C 8/005 433/173 |
| 2007/0190491 | A1 * | 8/2007 | Blackbeard | A61C 8/0018 433/174 |
| 2010/0055646 | A1 * | 3/2010 | Zhao | A61C 8/0018 433/215 |
| 2016/0206407 | A1 | 7/2016 | Kim | |
| 2017/0354485 | A1 * | 12/2017 | Chu | A61C 8/0056 |
| 2018/0028287 | A1 * | 2/2018 | Rodriguez Ciurana | A61C 8/0078 |
| 2018/0147037 | A1 * | 5/2018 | Kim | A61C 8/0062 |
| 2019/0201169 | A1 * | 7/2019 | Goodman | A61C 8/0089 |
| 2020/0352684 | A1 * | 11/2020 | Kim | A61C 8/0068 |
| 2021/0068932 | A1 * | 3/2021 | Venanzoni | A61C 8/0054 |
| 2021/0128278 | A1 * | 5/2021 | Richard | A61C 8/0012 |
| 2022/0039924 | A1 | 2/2022 | Venanzoni et al. | |

FOREIGN PATENT DOCUMENTS

| | | | |
|---|---|---|---|
| DE | 202018104914 | U1 | 12/2019 |
| DE | 102019111699 | A1 | 11/2020 |
| EP | 0879580 | A2 | 11/1998 |
| EP | 2151213 | A1 | 2/2010 |
| ES | 2323337 | A1 | 7/2009 |
| FR | 2806291 | A1 | 9/2001 |

* cited by examiner

DENTAL IMPLANT, SUPERSTRUCTURE, AND DENTAL PROTHESIS

CROSS REFERENCE TO RELATED APPLICATIONS

This application is a divisional of U.S. patent application Ser. No. 17/874,889, filed on Jul. 27, 2022, which is a continuation of International Application No. PCT/EP2021/052030, filed on Jan. 28, 2021, which claims priority to German Patent Application No. DE 10 2020 102 307.3, filed on Jan. 30, 2020. The entire disclosures of these applications are incorporated herein by reference.

FIELD

The present disclosure relates to a dental implant and to a superstructure for use in a dental prosthesis. Furthermore, the disclosure relates to a dental prosthesis comprising the dental implant and/or the superstructure.

BACKGROUND

The term "dental implant" is often colloquially used inconsistently and often erroneously for the overall structure of a dental prosthesis. Therefore, it should be clarified at this point that a "dental implant" in the medical and present sense is understood to mean only the implant body, i.e. the artificial tooth root that is implanted in the patient's jaw. Therefore, the term "implant body" is often used instead of the term "dental implant". In the following, however, the term "dental implant" is uniformly used for the aforesaid part of the dental prosthesis.

The term "superstructure" refers to a denture attached to a dental implant. This can be, for example, an artificial dental crown (also called "implant crown"), a bridge or any other prosthetic or artificial dental structure.

In addition to the dental implant and the superstructure, conventional dental prostheses comprise a so-called abutment, which acts as a connecting part between the dental implant and the superstructure. The abutment forms the sensitive transition through the peri-implant soft tissue to the oral cavity and the superstructure. Such abutments are sometimes referred to as "pillars" or "implant posts". Commonly, abutments are made of titanium, ceramic or ceramic composites such as aluminum oxide ceramic or zirconium dioxide ceramic.

The superstructure, i.e. the artificial dental crown, is typically made of ceramic or a comparable material. Traditionally, the superstructure is made by a dental technician as follows: First, a wax model is created for the artificial dental crown. Then, the wax model is used to cast the artificial dental crown. The abutment is manually ground to the correct size and shape, and in the final step the cast artificial dental crown is mounted on the abutment. In most cases, the assembly is performed by bonding the superstructure to the abutment. This largely manual process allows highly precise results to be achieved. However, it goes without saying that this is time-consuming and therefore also cost-intensive. Additionally, there is an adhesive gap between the superstructure and the abutment, which gap is susceptible to leaks and can also limit the durability of the dental prosthesis.

Nowadays, there are many efforts to digitize or automate the abovementioned process as far as possible. The superstructure is now often milled on a milling machine using a 3D model. In this type of fabrication, the connection geometry for the connection with the abutment is directly introduced into the superstructure on its rear side. The shape and size of the abutment must therefore already be known during the fabrication of the artificial dental crown in order to be able to program the milling machine accordingly. This is usually done by means of a CAD model of the abutment, which is read into the control system of the milling machine.

Since the shape and size of the abutment must be known before fabricating the superstructure, many manufacturers choose a short and small abutment that fits any anatomy. However, with elongated, i.e. comparatively long superstructures, a short and small abutment is biomechanically unsuitable in relation to the superstructure, which may result in loosening or fractures.

Other manufacturers solve this by means of a plurality of different abutments. Depending on the shape and size of the superstructure, abutments of different sizes or shapes are then used. For example, a different abutment has to be used for an artificial incisor than for an artificial molar tooth. If, for example, the rear flank of the abutment is not beveled when used for an artificial incisor, the abutment would be visible on the rear side of the superstructure, which is undesirable from a purely esthetic point of view. However, this problem may not arise when used for an artificial molar tooth.

In automated fabrication with digital CAD models, the manufacturer of the superstructure is usually provided with several CAD data sets that represent the different shapes of the abutments. At the same time, the manufacturer of the superstructure has to keep a large number of abutments of different shapes and sizes in stock. This is often cumbersome and also generates high storage costs.

The disadvantages of the previous approaches can thus be summarized as follows: On the one hand, the use of abutments restricts the freedom of shape and design of the superstructure including its transgingival portion. A non-flexible transgingival portion of the superstructure can cause problems, particularly with soft tissue management. However, ideal soft-tissue management is crucial for an esthetic result and a long-term stable bone level. On the other hand, the material and manufacturing costs for such a dental prosthesis according to the prior art are relatively high. In addition, there is an adhesive gap between the superstructure and the abutment, which gap is disadvantageous in many respects.

DE 10 2018 113 237 A1 describes a completely new approach in which a dental prosthesis of the abovementioned type manages even without an abutment, i.e. wherein the superstructure is connected directly to the dental implant. This is achieved in particular by specially configured interfaces on the dental implant and the superstructure, permitting the two components to be fixed directly to each other. The interface on the dental implant and the interface which is complementary thereto on the superstructure permit a geometrically unambiguously defined arrangement of the superstructure directly on the dental implant (without an abutment arranged in between). This guarantees an unambiguously defined relative position between superstructure and dental implant.

In order to avoid an undesirable rotation of the superstructure in relation to the dental implant, an anti-rotation device is required. In the case of the dental implant described in DE 10 2018 113 237 A1, said anti-rotation device is achieved by a non-rotationally symmetrical design of said interface on the dental implant and an interface, correspondingly formed as a counterpart, on the superstructure.

Although the dental implant described in DE 10 2018 113 237 A1 has proven entirely advantageous, the inventors have set themselves the aim of improving the anti-rotation device of the dental implant to an even greater extent.

SUMMARY

It is an object to provide a dental implant and a superstructure that can be connected directly to each other without the use of an abutment, comprising an improved anti-rotation device for preventing rotation of the superstructure in relation to the dental implant.

According to a first aspect, a dental implant is provided, which comprises, on an outer side, an external thread for fixing the dental implant to a jaw bone, and an opening which extends along a central longitudinal axis of the dental implant and in which an internal thread for fixing a superstructure to the dental implant is arranged, wherein the dental implant furthermore comprises an interface for fixing the superstructure to the dental implant, said interface being arranged in a region of an end face of the dental implant and comprising an inner surface which is arranged in the opening and at least partially surrounds the longitudinal axis. The dental implant furthermore comprises an anti-rotation element that is arranged in the opening and is configured to prevent the superstructure from rotating about the longitudinal axis relative to the dental implant. The anti-rotation element is at a smaller distance from the longitudinal axis than the inner surface. A radially outer side of the anti-rotation element that faces away from the longitudinal axis faces the inner surface and is spaced apart therefrom such that there is an upwardly open cavity between the radially outer side of the anti-rotation element and the inner surface.

According to a second aspect, a superstructure is provided, which comprises an opening extending along a central longitudinal axis of the superstructure and an interface for fixing the superstructure to a dental implant. The interface is configured as an extension that is arranged on a lower side of the superstructure, surrounds the opening and has a lateral surface which forms an outer side of the extension. The lateral surface of the extension is interrupted by a recess which leads into the opening extending along the central longitudinal axis of the superstructure. The recess has two mutually opposite side flanks which, in a cross section oriented orthogonally with respect to the longitudinal axis, are at a first distance from each other in a first region and, in a second region which is at a greater distance from the longitudinal axis than the first region, are at a second distance from each other that is smaller than the first distance.

The anti-rotation element provided on the dental implant produces a type of undercut in which the extension, which is provided on the lower side of the superstructure, at least partially engages. The undercut refers here to the upwardly open cavity which is formed between the radially outer side of the anti-rotation element and the inner surface of the dental implant. The superstructure engages in said cavity with a radially outer end of the extension.

For this purpose, the recess which is introduced into the extension arranged on the lower side of the superstructure tapers somewhat radially outward. In other words, the recess is narrower at its radially outer end than at its radially inner end, which is arranged closer to the central longitudinal axis. This tapering of the recess is apparent in particular in the mentioned cross section which is oriented orthogonally with respect to the central longitudinal axis of the superstructure.

The cavity mentioned which is produced on the dental implant by the anti-rotation element and the tapering mentioned of the recess introduced into the extension of the superstructure lead in particular to the following advantages: firstly, a mechanically highly stable anti-rotation device can thereby be realized. Not only the anti-rotation element arranged on the dental implant, but also the extension formed on the lower side of the superstructure can be formed in a mechanically stable way.

The increase in stability at the extension of the superstructure should essentially be attributed to the fact that the recess which is provided therein can be comparatively small, in particular because of its tapering outward. The tapering of the recess means that the latter can be, for example, smaller than the recess which has purely rectilinear side flanks on the superstructure disclosed in the earlier patent application with the application number 10 2019 111 699.6. Furthermore, the cavity provided on the dental implant and the associated shape of the recess on the extension of the superstructure permit a more compact design of the superstructure and of the dental implant.

According to a refinement of the dental implant, the upwardly open cavity tapers downward, as viewed in a longitudinal section of the dental implant, such that a first distance between the radially outer side of the anti-rotation element and the inner surface, as measured in the longitudinal section in a region of an upwardly open end of the cavity, is greater than a second distance between the radially outer side of the anti-rotation element and the inner surface, as measured in the longitudinal section in a region of a lower end of the cavity.

The cavity preferably essentially has a V shape in this longitudinal section. The mentioned longitudinal section of the dental implant is spanned by the longitudinal axis of the dental implant and by a radial direction oriented orthogonally with respect thereto.

The mentioned tapering of the cavity downward has in particular the advantage that the inner surface of the dental implant produces a supporting effect for the superstructure. In addition, the superstructure can be mounted relatively simply on the dental implant and the corresponding part of the superstructure can be introduced from above into the cavity.

According to a refinement, the anti-rotation element provided on the dental implant comprises two planar drive surfaces extending parallel to each other.

In the mounted state of the dental prosthesis, said planar drive surfaces preferably lie on planar drive surfaces which are shaped equivalently thereto and are arranged on the two opposite side flanks of the recess provided on the superstructure. The drive surfaces serve for absorbing force in the circumferential direction and prevent rotation or torsion of the superstructure about the longitudinal axis relative to the dental implant.

Preferably, the drive surfaces provided on the dental implant and the mutually corresponding drive surfaces provided on the superstructure each run parallel to each other and parallel to the respective longitudinal axis of the dental implant or of the superstructure.

It should be noted at this juncture that, in the mounted state of the dental prosthesis, the longitudinal axis of the dental implant preferably coincides with the longitudinal axis of the superstructure.

Furthermore, it is preferred that the drive surfaces which are provided on the dental implant and the mutually corresponding drive surfaces which are provided on the superstructure each run parallel to a radial direction which is oriented orthogonally with respect to the respective longitudinal axis.

Such an orientation permits a large transmission of the forces acting in the circumferential direction between superstructure and dental implant. Owing to the orientation mentioned, the drive surfaces can also be produced very simply by milling.

In the mounted state of the dental prosthesis, between the anti-rotation element provided on the dental implant and the recess provided on the superstructure there is preferably only contact along said planar drive surfaces. This ensures a mechanically defined contact between superstructure and dental implant, the contact not being mechanically overdetermined.

According to a further refinement, the anti-rotation element has a convex-concave shape in a cross section which is oriented orthogonally to the longitudinal axis.

The anti-rotation element is preferably a type of lamella or web which is offset radially further inward in comparison to the described inner surface which, in the region of the interface of the dental implant, forms the inner circumferential surface of the opening introduced centrally therein. Said anti-rotation element preferably runs parallel to the longitudinal axis of the dental implant. By means of its convex-concave cross section, the anti-rotation element is optimally adapted to the shape of the opening (bore) in the dental implant and therefore takes up relatively little space.

The anti-rotation element preferably has a constant wall thickness. The wall thickness measured in the cross section (orthogonally with respect to the longitudinal axis of the dental implant) is meant here.

The constant wall thickness has the advantage that the anti-rotation element, which is configured as a lamella or web, has a high degree of rigidity despite its space-saving design. In addition, the screw which is used for connecting the superstructure to the implant can thereby lie stably on the implant. In more precise terms, the anti-rotation element provides a contact surface for the screw.

A radially inner side of the anti-rotation element, which side lies opposite the radially outer side of the anti-rotation element, preferably runs parallel to the radially outer side of the anti-rotation element and therefore likewise parallel to the longitudinal axis. This therefore preferably results in a convex-concave cross section of the anti-rotation element with mutually opposite sides which run parallel to one another and run transversely with respect to the planar drive surfaces provided on the anti-rotation element.

The term “transversely” is preferably understood here as meaning any type of orientation which is not parallel. “Transversely” is therefore preferably, but not necessarily, understood as meaning orthogonally. Orientations deviating from vertical orientations are also referred to here as transversely if said orientations are not parallel to one another.

According to a further refinement, the interface provided on the dental implant is mirror-symmetrical with respect to a longitudinal sectional plane in which the longitudinal axis lies and which divides the anti-rotation element into two halves of identical size. Equivalently thereto, it is preferred that the extension which is provided on the lower side of the superstructure is mirror-symmetrical with respect to a longitudinal sectional plane in which the longitudinal axis and which divides the recess into two halves of identical size. The anti-rotation element arranged on the dental implant and the recess which is shaped in a complementary manner with respect thereto and is provided in the extension of the superstructure are preferably likewise mirror-symmetrical with respect to said longitudinal sectional plane.

According to a further refinement, the inner surface comprises a curved surface that is curved convexly in a longitudinal section in which the longitudinal axis lies. This curved surface preferably extends over an angular range of at least 90 degrees (°) about the longitudinal axis of the dental implant. Particularly preferably, the curved surface runs (360°) about the longitudinal axis of the dental implant.

A “convex” curvature is understood here as meaning any outwardly curved curvature; a convex curvature forms the counterpart to a concave, inwardly curved trough. Simply for clarification purposes, the convex curvature is additionally also defined here as rounded even though the term “convex” already implies such a rounding. The curvature which is defined here as convex and rounded preferably has a continuous tangent slope (without a “bend”).

Said convexly curved surface which forms part of the inner surface of the dental implant serves for fixing the superstructure to the dental implant. In the mounted state of the dental prosthesis, the latter preferably lies on a concavely curved lateral surface of the superstructure that is shaped in a complementary manner with respect thereto.

The two curved surfaces which are shaped in a complementary manner with respect to each other absorb forces in the radial direction, i.e. orthogonally with respect to the longitudinal axis of the dental implant. In addition, they are used to center the superstructure in relation to the dental implant.

According to a further refinement, the interface of the dental implant comprises a support surface that is arranged radially further outward than the inner surface, wherein the support surface extends around the longitudinal axis and is, all around the longitudinal axis, oriented at a constant angle transversely with respect to the longitudinal axis.

This support surface is preferably a circular-ring-shaped support surface which surrounds the convexly curved surface. The circular-ring-shaped support surface preferably has a constant angle greater than 60° all around with respect to the longitudinal axis of the dental implant. Said angle is particularly preferably a right angle (90°).

In the mounted state of the dental prosthesis, said support surface lies on a support surface which is shaped in a complementary manner with respect thereto and is arranged on the lower side of the superstructure. This serves for absorbing axial forces parallel to the longitudinal direction. Tensile stresses which could lead to fracturing of the superstructure are thereby avoided. Furthermore, the two support surfaces which are formed in a complementary manner with respect to each other on the dental implant and the superstructure are used as boundary surfaces or sealing surfaces in order to avoid intermediate spaces along the circumference between the superstructure and the dental implant, through which intermediate spaces impurities might enter.

The support surfaces therefore preferably form the radially outermost region of the respective interface on the dental implant and on the superstructure, which surrounds all of the other regions of the respective interface. Said support surface is therefore also preferably arranged radially further outward than the anti-rotation element and is therefore at a greater radial distance from the longitudinal axis than the anti-rotation element.

The support surface which is arranged on the dental implant preferably forms an end surface which is arranged on the upper side of the dental implant and over which the anti-rotation element does not protrude. The anti-rotation element is therefore arranged below the support surface.

According to a further refinement, the convexly curved surface which forms part of the inner surface of the dental implant is directly adjacent to the support surface. A radially outer edge of the inner surface preferably merges tangentially into the support surface.

Furthermore, it is preferred that the internal thread which is provided in the dental implant is at a greater distance from the end face of the dental implant than the anti-rotation element. In other words, the anti-rotation element is therefore preferably arranged above the internal thread and therefore closer to the end face of the dental implant.

The following refinement possibilities are provided with regard to the superstructure:

According to a refinement, each of the two mutually opposite side flanks of the recess comprises a planar drive surface and an adjacent, concavely curved surface, wherein the planar driver surfaces are each arranged in the first region of the side flanks, and the concavely curved surfaces are each arranged in the second region of the side flanks.

The concavely curved surfaces and the planar drive surfaces of the two side flanks of the recesses each lie opposite one another. The concavely curved surfaces which are at a greater distance from the longitudinal axis, i.e. are arranged radially further outward than the planar drive surfaces, ensure the abovementioned tapering of the recess. In particular, in the mounted state of the dental prosthesis, that part of the concavely curved surfaces which is arranged radially further outward is arranged in the cavity provided behind the anti-rotation element in the dental implant. With the aid of the concavely curved surfaces, the extension which is arranged on the lower side of the superstructure at least partially engages around the anti-rotation element.

The concavely curved surfaces are preferably curved concavely in the cross section which is oriented orthogonally with respect to the longitudinal axis. By contrast, the drive surfaces are configured as flat, planar surfaces.

As already mentioned, the two drive surfaces which are arranged on the side flanks of the recess lie opposite each other and run parallel to each other and preferably parallel to the longitudinal axis of the superstructure. In the mounted state of the dental prosthesis, the anti-rotation element particularly preferably lies only on said drive surfaces and otherwise has no further contact with the superstructure.

According to a further refinement, the recess is arranged in the region of a lower free end of the extension and is open downward toward the free end. The recess is particularly preferably configured as a tunnel-like recess.

This has the advantage that the superstructure can be mounted very simply on the dental implant despite the anti-rotation device. The recess is namely merely placed from above onto the anti-rotation element or is at least partially pulled over the latter. Owing to the complementary design of the recess and of the anti-rotation element relative to each other, an unambiguous positioning of the superstructure relative to the dental implant is guaranteed.

According to a further refinement, the recess in the radial direction runs orthogonally with respect to the longitudinal axis. Preferably, in particular a longitudinal direction along which the recess extends runs in the radial direction. The drive surfaces arranged on the two side flanks preferably run parallel to said longitudinal direction or parallel to the radial direction of the superstructure.

According to a further refinement, the lateral surface which is arranged on the outer side of the extension is curved concavely in a longitudinal section in which the longitudinal axis lies. The lateral surface is preferably curved concavely in each longitudinal section in which the longitudinal axis lies. The lateral surface is preferably configured as a counterpart to the convexly curved inner surface provided on the dental implant. This surface is used to center the superstructure in relation to the dental implant. In addition, forces can be absorbed by it in the radial direction.

As already mentioned at the beginning, the present disclosure relates not only to the dental implant and the superstructure, but also to a dental prosthesis having such a dental implant and/or such a superstructure. The superstructure is preferably fixed directly to the dental implant with the aid of a fixing element. A screw is particularly preferably used as the fixing element.

It goes without saying that the features mentioned above and those which have yet to be explained below are usable not only in the respectively stated combination, but also in different combinations or by themselves without departing from the spirit and scope of the present disclosure.

DETAILED DESCRIPTION

Figure 1:
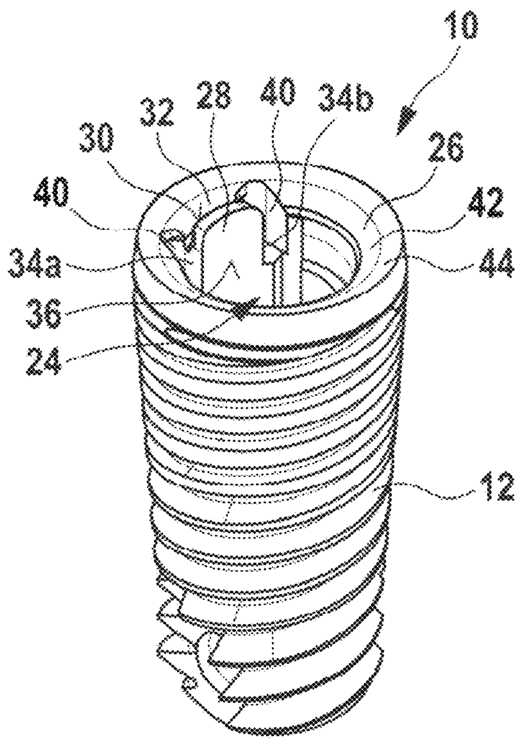
FIG. 1 shows a perspective view of a dental implant according to the principles of the present disclosure.

FIGS. 1-4 show an embodiment of a dental implant according to the present disclosure in various views. The dental implant is denoted therein in its entirety by the reference numeral 10.

The dental implant 10 is typically manufactured from titanium or zirconium oxide. It has, on its outer side, an external thread 12 which can be used to screw the dental implant 10 in a patient's jaw bone. The dental implant 10 extends substantially along a longitudinal axis 14, which may also be referred to as the center axis. In its interior, the dental implant 10 has an opening 16 which extends along the longitudinal axis 14. At least part of said opening 16 is preferably configured as a bore, particularly preferably as a blind bore.

Figure 9:
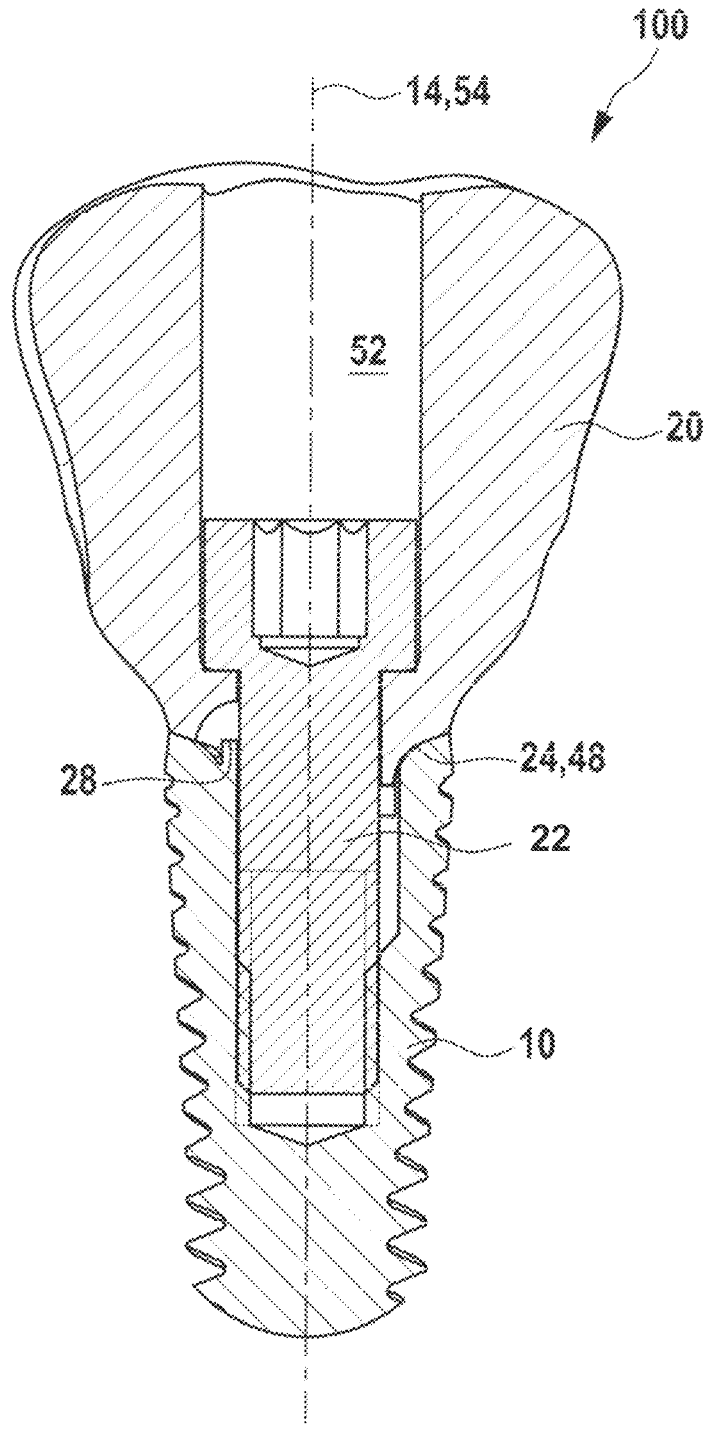
FIG. 9 shows a longitudinal sectional view of a dental prosthesis according to the principles of the present disclosure.

An internal thread 18 is arranged in the opening 16. Said internal thread 18 is used to fix a superstructure 20 (artificial dental crown) to the dental implant 10. In order to fix the superstructure 20 to the dental implant 10, use is preferably made of a screw 22 which engages in the internal thread 18 (see FIG. 9). Instead of a screw 22, use may basically also be made of a different type of fixing means, for example a bolt, for connecting the superstructure 20 to the dental implant 10.

Figure 4:
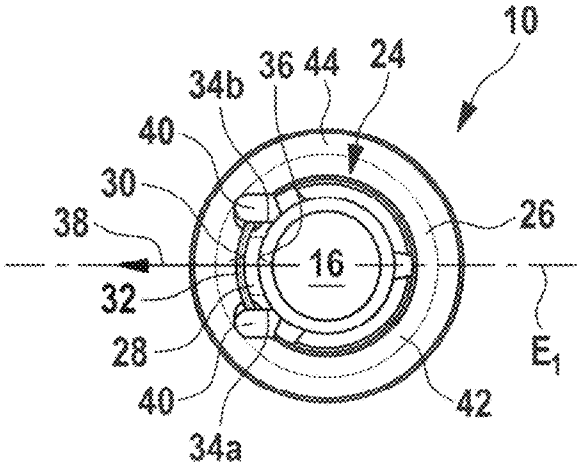
FIG. 4 shows a top view of the dental implant shown in FIG. 1.

On the upper end face, the dental implant 10 has an interface 24 which is illustrated in the top view shown in FIG. 4. Said interface 24 is used for fixing the superstructure 20 to the dental implant 10. The interface 24 forms, as it were, the contact region with which the dental implant 10 makes contact with the superstructure 20 in the mounted state of a dental prosthesis 100.

A particular characteristic of the interface 24 can be seen in the fact that the latter, because of its shape and design, permits the superstructure 20 to be directly attached to the dental implant 10 (without the use of an abutment arranged in between).

The interface 24 has an inner surface 26 which is arranged in the opening 16. Said inner surface 26 is an inner lateral surface which at least partially surrounds the longitudinal axis 14. The inner lateral surface 26 faces the longitudinal axis 14. Each normal vector which is oriented perpendicularly to said inner lateral surface 26 preferably intersects the longitudinal axis 14, specifically independently of the point at which said normal vector is placed onto the inner lateral surface 26. In the exemplary embodiment shown here, the inner lateral surface 26 is at least partially convexly curved, as viewed in longitudinal section, as will be explained in more detail further below.

The interface 24 furthermore has an anti-rotation element 28. In the mounted state of the dental prosthesis 100, said anti-rotation element 28 prevents the superstructure 20 from rotating in relation to the dental implant 10. In the embodiment shown here, the anti-rotation element 28 is connected integrally to the dental implant 10. However, in principle, the anti-rotation element 28 can also be configured as a separate component which is fixed in the dental implant 10.

The anti-rotation element 28 preferably runs parallel to the longitudinal axis 14. In comparison to the previously mentioned convexly curved inner surface 26, the anti-rotation element 28 is arranged radially somewhat further inward, i.e. closer to the longitudinal axis 14. As can be seen from the top view shown in FIG. 4, the anti-rotation element 28 has a convex-concave shape in a cross section orthogonally with respect to the longitudinal axis 14. A radially outer side 30 of the anti-rotation element 28 faces away from the longitudinal axis 14. Said radially outer side 30 faces part of the inner lateral surface 26. However, the radially outer side 30 of the anti-rotation element 28 is spaced apart from the inner lateral surface 26 such that a cavity 32, which is a type of undercut, is produced between the radially outer side 30 of the anti-rotation element 28 and the inner lateral surface 26. Said cavity 32 is open upward.

Figure 2:
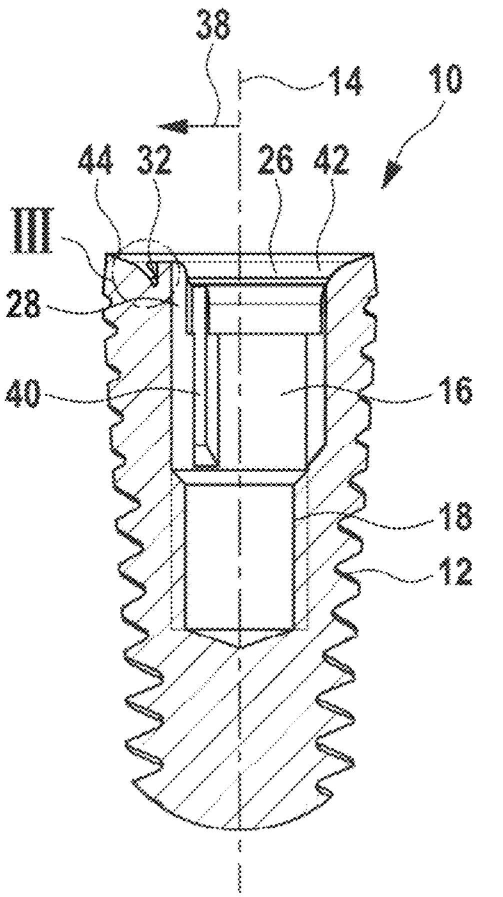
FIG. 2 shows a longitudinal sectional view of the dental implant shown in FIG. 1.
Figure 3:
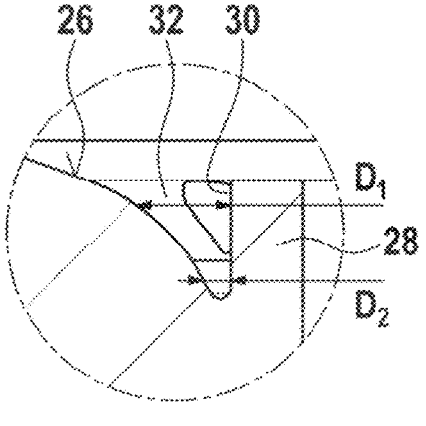
FIG. 3 shows an enlarged view of a portion of the dental implant shown in FIG. 2 within a circle III shown in FIG. 2.

As is apparent in particular from FIG. 3 which shows a detail of the longitudinal section shown in FIG. 2, the cavity 32 tapers downward. The cavity 32 has approximately the shape of a V, as viewed in this longitudinal section. Expressed in other words, a first distance D1 between the radially outer side 30 of the anti-rotation element 28 and the inner surface 26, as measured in the longitudinal section in the region of the upper open end of the cavity 32, is greater than a second distance D2 between the radially outer side 30 of the anti-rotation element 28 and the inner surface 26, as measured in the longitudinal section in the region of a lower end of the cavity 32.

As is likewise apparent from FIG. 3, the anti-rotation element 28 preferably has a constant wall thickness. The wall thickness of the anti-rotation element 28 is constant at least in cross section (also see FIG. 4).

As will also be explained in detail further below, a part of the superstructure 20 engages in said cavity 32, thus enabling a special manner of configuring the superstructure 20 and a special manner of connecting the superstructure 20 to the dental implant 10 in the region of the anti-rotation element 28.

The radially inner side 36 of the anti-rotation element 28, which side is opposite the radially outer side 30, faces the opening 16 or the longitudinal axis 14. While the radially outer side 30 is preferably a convex surface, the radially inner side 36 is preferably a concave surface. Accordingly, the anti-rotation element 28 is adapted to the cross-sectional shape of the opening or bore 16, and is therefore comparatively space-saving. The internal thread 18 is freely accessible from above for the screw 22.

The anti-rotation element 28 furthermore has two mutually opposite drive surfaces 34*a*, 34*b*. Said two drive surfaces 34*a*, 34*b* are arranged on opposite sides of the anti-rotation element 28. The drive surfaces 34*a*, 34*b* run transversely and between the radially outer side 30 and the radially inner side 36 of the anti-rotation element 28. They are each configured as planar surfaces.

The two drive surfaces 34*a*, 34*b* preferably run parallel to a radial direction 38 which is oriented orthogonally with respect to the longitudinal axis 14. Said radial direction 38 is in each case indicated as an arrow in FIGS. 2 and 4. An imaginary longitudinal sectional plane $E_1$ spanned by said radial direction 38 and the longitudinal axis 14 divides the anti-rotation element 28 into two halves of identical size. The anti-rotation element 28 is preferably mirror-symmetrical with respect to said longitudinal sectional plane $E_1$.

The drive surfaces 34*a*, 34*b* are used as contact surfaces for corresponding counter surfaces which are arranged on the superstructure 20. The drive surfaces 34*a*, 34*b* are essentially used to absorb a torque acting about the longitudinal axis 14 between the superstructure 20 and the dental implant 10. They prevent the superstructure 20 from rotating about the longitudinal axis 14 in relation to the dental implant 10.

Owing to the described arrangement of the drive surfaces 34*a*, 34*b*, the latter essentially absorb forces acting in the circumferential direction. In the mounted state of the dental prosthesis 100, the superstructure 20 preferably makes contact with the anti-rotation element 28 only along said two drive surfaces 34*a*, 34*b*.

In this embodiment, material incisions 40 are provided on both sides laterally next to the anti-rotation element 28. Said material incisions 40 are essentially used to simplify the production of the dental implant 10 in terms of manufacturing.

The interface 24 is preferably mirror-symmetrical with respect to the previously mentioned imaginary plane $E_1$. As already mentioned, the inner surface 26 belonging to the interface 24 has a curved surface 42 which is curved convexly in the longitudinal section shown in FIG. 2. Said convexly curved surface 42 preferably runs around the longitudinal axis 14. It lies on a concavely curved surface, which is correspondingly shaped as a counterpart, on the superstructure 20. The convexly curved surface 42 is used essentially for absorbing forces in the radial direction 38.

The convexly curved surface 42 is surrounded by a support surface 44 which is essentially used for absorbing axial forces, i.e. forces parallel to the longitudinal axis 14. The support surface 44 is arranged radially further outward than the convexly curved surface 42. In the embodiment shown here, the convexly curved surface 42 merges, preferably tangentially, at its radially outer edge into the support surface 44. The support surface 44 extends around the longitudinal axis 14 and is oriented around the latter at a constant angle transversely with respect to the longitudinal axis 14. In the present case, this angle is an angle less than 90°. The support surface 44 is therefore a conical surface. In principle, however, the support surface 44 may also be oriented orthogonally with respect to the longitudinal axis 14. Irrespective of the angle of the support surface 44 with respect to the longitudinal axis 14, it is preferred, as already mentioned, for said support surface to merge tangentially into the convexly curved surface 42.

In the mounted state of the dental prosthesis 100, the superstructure 20 is supported both on the convexly curved surface 42 and on the support surface 44.

As viewed in the longitudinal section of the dental implant 10 (see FIG. 2), the convexly curved surface 42 is preferably configured as a sector of a circle. Accordingly, the convexly curved surface 42 forms part of the surface of a torus. Like also the remaining parts of the interface 24, it can therefore be produced very simply using a ball cutter. However, it goes without saying that the convexly curved surface 42 does not inevitably have to be circular in the longitudinal section. In the described longitudinal section of the dental implant 10, it can also be shaped elliptically or configured as a freely shaped surface, but it is preferably "bend-free" in said cross section.

Figure 5:
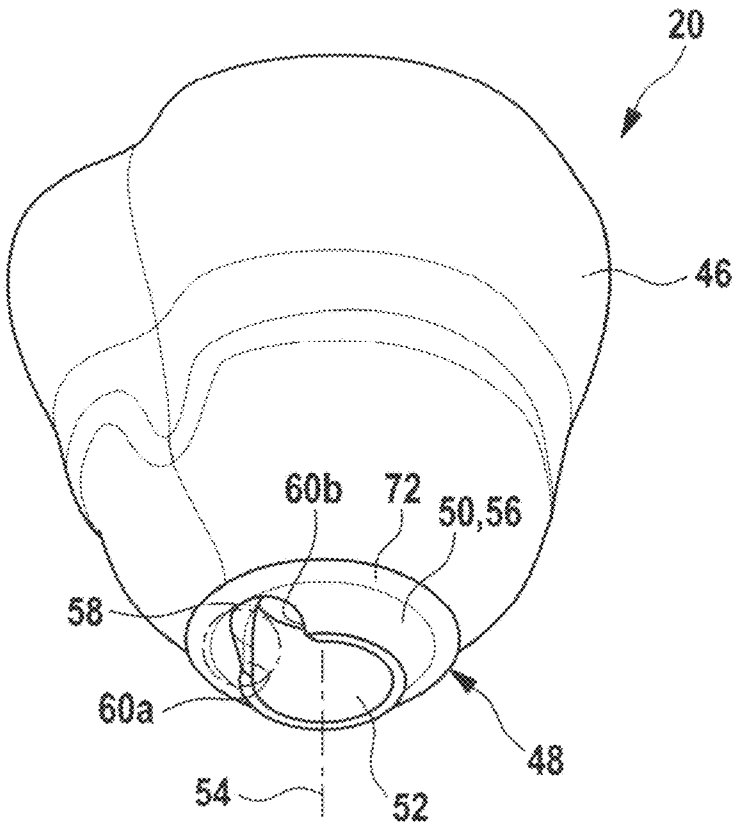
FIG. 5 shows a perspective view of a superstructure according to the principles of the present disclosure.
Figure 6:
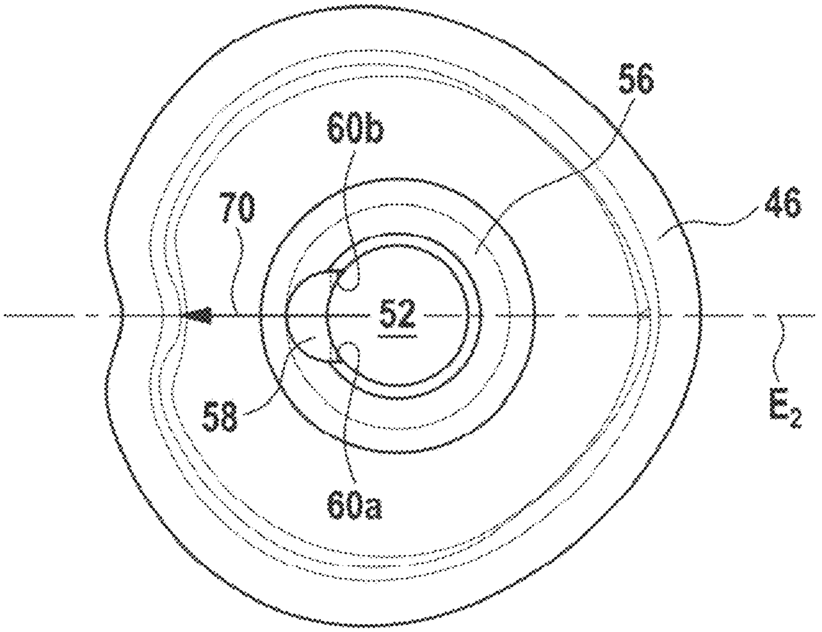
FIG. 6 shows a bottom view of the superstructure shown in FIG. 5.

FIGS. 5 and 6 show an embodiment of the superstructure 20 which serves as a counterpart to the dental implant shown in FIGS. 1-4. The superstructure 20 has an artificial denture 46 which is illustrated here as an artificial dental crown. An interface 48 which is used for the connection to the dental implant 10 is arranged on the lower side of said artificial dental crown 46.

The interface 48 has an extension 50 which protrudes downward from the lower side of the artificial dental crown 46. This extension 50 is configured as a corresponding counterpart to the interface 24 arranged on the dental implant 10.

In the interior, the superstructure 20 has an opening 52 which is preferably configured as a through bore. Said opening 52 is closed at the upper end face of the artificial dental crown 46 after the dental prosthesis 100 is fitted to the patient. The opening 52 essentially extends along a longitudinal axis 54 of the superstructure 20. In the mounted state of the dental prosthesis 100, the longitudinal axis 54 of the superstructure 20 coincides with the longitudinal axis 14 of the dental implant 10 (see FIG. 9).

The interface 48 has a lateral surface 56 which forms an outer side of the extension 50 and surrounds the opening 52 in the circumferential direction. In the exemplary embodiment shown in FIGS. 5 and 6, the lateral surface 56 is formed concavely as a counterpart to the inner lateral surface 26 arranged on the dental implant 10. In more precise terms, the outer lateral surface 56 of the extension 50 is curved concavely in a longitudinal section in which the longitudinal axis 54 of the superstructure 20 lies. The outer lateral surface 56 preferably has the shape of a sector of a circle in this longitudinal section. However, like the inner lateral surface 26 on the dental implant 10, the outer lateral surface 56 can also be shaped elliptically or can have a free shape in the longitudinal section.

In principle, it is also possible to design the outer lateral surface 56 of the extension 50 as a conical or cylindrical surface. In such a case, the inner lateral surface 26 on the dental implant 10 is then also correspondingly configured as a conical or cylindrical surface.

Furthermore, the interface 48 has a recess 58 which is introduced laterally into the extension 50. The recess 58 is used as a counterpart to the anti-rotation element 28. In the mounted state of the dental prosthesis 100, the anti-rotation element 28 engages in said recess 58.

The recess 58 is open downward. Accordingly, it does not have a closed contour, but rather is open on one side to the lower end face of the interface 48. Accordingly, the recess 58 can also be described as a tunnel-like or tunnel-shaped recess.

The recess 58 passes through the side wall of the extension 50. It therefore interrupts the lateral surface 56 and leads into the opening 52 running in the interior of the superstructure 20.

Figure 7:
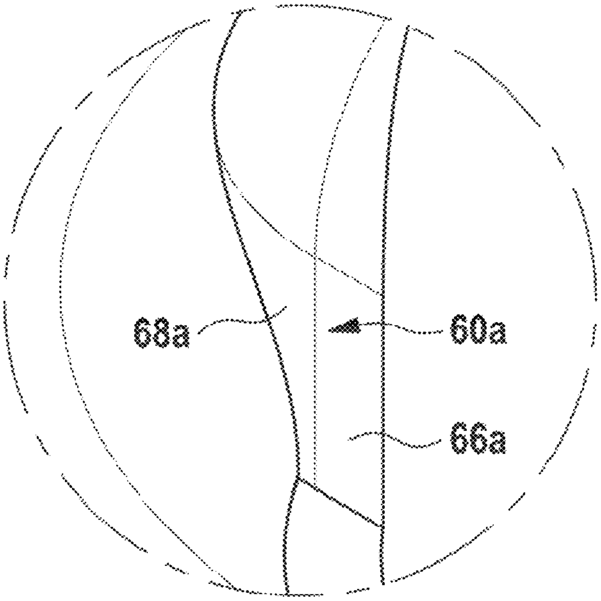
FIG. 7 shows an enlarged view of a portion of the superstructure shown in FIG. 5 within a chain-dotted circle shown in FIG. 5.
Figure 8:
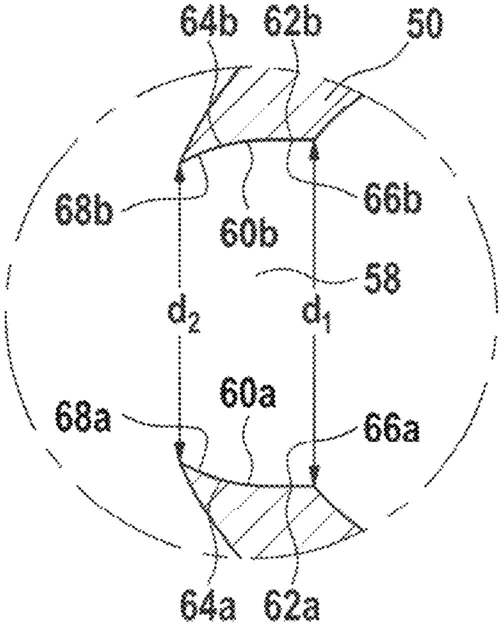
FIG. 8 shows a cross section of a portion of the superstructure shown in FIG. 5.

The recess 58 has two mutually opposite side flanks 60*a*, 60*b*. One of these two side flanks 60*a* is illustrated in detail in FIG. 7. FIG. 8 shows the cross-sectional shape of the recess 58 in detail. In more precise terms, FIG. 8 is a detailed cutout of a cross section orthogonally with respect to the longitudinal axis 54 of the superstructure 20 through the extension 50.

As can be seen in particular from FIG. 8, each of the two side flanks 60*a*, 60*b* has a first region 62*a* or 62*b*, in which the side flanks 60*a*, 60*b* are configured as planar surfaces. By contrast, in a second region 64*a*, 64*b* arranged radially further outward, the two side flanks 60*a*, 60*b* are each configured as concavely curved surfaces. This leads to the recess 58 in said cross section tapering radially outward. In the first region 62*a*, 62*b*, the two side flanks 60*a*, 60*b* are therefore at a greater distance $d_1$ than in the second region 64*a*, 64*b*. In the second region 64*a*, 64*b*, the two side flanks 60*a*, 60*b* of the recess 58 are at a second distance $d_2$ from each other which is smaller than the first distance $d_1$.

In the radially inner first region 62*a*, 62*b*, the two side flanks 60*a*, 60*b* preferably each have a planar drive surface 66*a*, 66*b*, the drive surfaces serving as counterparts to the drive surfaces 34*a*, 34*b* which are arranged laterally on the anti-rotation element 28. The superstructure 20 preferably lies on the anti-rotation element 28 only by said two mutually opposite drive surfaces 66*a*, 66*b*. In a similar manner to the drive surfaces 34*a*, 34*b* acting as a counterpart, the planar drive surfaces 66*a*, 66*b* run parallel to each other and parallel to the longitudinal axis 54 of the superstructure.

Radially further outward, each side flank 60*a*, 60*b* in each case has a concavely curved surface 68*a*, 68*b*. The concavely curved surfaces 68*a*, 68*b* are preferably directly adjacent to the drive surfaces 66*a*, 66*b* of the respective side flank 60*a*, 60*b* and merge tangentially into them. In the mounted state of the dental prosthesis 100, the concavely curved surfaces 68*a*, 68*b* protrude at least partially into the cavity 32 which is formed behind the anti-rotation element 28 between the radially outer side 30 thereof and the inner lateral surface 26 of the dental implant 10.

Apart from the recess 58, the interface 48 provided on the superstructure 20 is (rotationally) symmetrical with respect to the longitudinal axis 54. The opening 52 accordingly preferably runs centrally through the extension 50 forming the interface 48. The entire interface 48 is therefore preferably also mirror-symmetrical with respect to a longitudinal sectional plane $E_2$ which is spanned by the longitudinal axis 54 and a radial direction 70 running orthogonally with respect thereto and divides the recess 58 into two halves of identical size (see FIG. 6).

In addition to the extension 50, the interface 48 of the superstructure 20 has a support surface 72 which surrounds the extension 50. Said circular-ring-shaped support surface 72 is used as a counterpart to the circular-ring-shaped support surface 44 arranged on the dental implant. In the present exemplary embodiment, it is therefore configured as a conical surface, but, as mentioned previously, may also be oriented orthogonally with respect to the longitudinal axis 54 of the superstructure 20.

What is claimed is:

1. A superstructure, comprising:

an opening extending along a central longitudinal axis of the superstructure and having an interface for fixing the superstructure to a dental implant, wherein the interface comprises an extension that is arranged on a lower side of the superstructure, surrounds the opening and has a lateral surface which forms an outer side of the extension, wherein the lateral surface is interrupted by a recess which leads into the opening, wherein the recess has a first side flank and a second side flank which are arranged opposite one another and face one another so as to define the recess therebetween, wherein the first side flank comprises a first planar drive surface and a first concavely curved surface arranged adjacent to the first planar drive surface, and the second side flank comprises a second planar drive surface and a second concavely curved surface arranged adjacent to the second planar drive surface, wherein the first planar drive surface and the second planar drive surface face one another, are oriented parallel to each other and define a first distance therebetween in a circumferential direction, the circumferential direction extending perpendicular to the longitudinal axis and perpendicular to a radial direction, the radial direction extending outward from and perpendicular to the longitudinal axis, the first concavely curved surface and the second concavely curved surface defining a second distance therebetween in the circumferential direction, the second distance being less than the first distance, wherein the first concavely curved surface is arranged farther from the longitudinal axis than the first planar drive surface in the radial direction, and the second concavely curved surface is arranged farther from the longitudinal axis than the second planar drive surface in the radial direction, and wherein a spacing between the first concavely curved surface and the second concavely curved surface in a direction parallel to the circumferential direction decreases with increasing radial distance from the longitudinal axis, thereby resulting in a tapering configuration with increasing radial distance from the longitudinal axis.

2. The superstructure as claimed in claim 1, wherein the first planar drive surfaces and the second planar drive surface are oriented parallel to the longitudinal axis.

3. The superstructure as claimed in claim 1, wherein the recess is arranged at a lower free end of the extension and is open toward the lower free end.

4. The superstructure as claimed in claim 1, wherein the recess is a tunnel-like recess.

5. The superstructure as claimed in claim 1, wherein the recess extends in the radial direction orthogonally to the longitudinal axis.

6. A superstructure, comprising:

an opening extending along a central longitudinal axis of the superstructure and having an interface for fixing the superstructure to a dental implant, wherein the interface comprises an extension that is arranged on a lower side of the superstructure, surrounds the opening and has a lateral surface which forms an outer side of the extension, wherein the lateral surface is interrupted by a recess which leads into the opening, wherein the recess has two mutually opposite side flanks which, in a cross section oriented orthogonally with respect to the longitudinal axis, are at a first distance from each other in a first region and, in a second region which is at a greater distance from the longitudinal axis than the first region, are at a second distance from each other, the second distance being smaller than the first distance, and wherein the lateral surface is curved concavely in a longitudinal section in which the longitudinal axis lies.

7. A dental prosthesis, comprising:

a dental implant;

a superstructure; and a fastening element configured to fasten the superstructure to the dental implant, the superstructure comprising an opening extending along a central longitudinal axis of the superstructure and having an interface for fixing the superstructure to the dental implant, wherein the interface comprises an extension that is arranged on a lower side of the superstructure, surrounds the opening and has a lateral surface which forms an outer side of the extension, wherein the lateral surface is interrupted by a recess which leads into the opening, and wherein the recess has a first side flank and a second side flank which are arranged opposite one another and face one another so as to define the recess therebetween, wherein the first side flank comprises a first planar drive surface and a first concavely curved surface arranged adjacent to the first planar drive surface, and the second side flank comprises a second planar drive surface and a second concavely curved surface arranged adjacent to the second planar drive surface, wherein the first planar drive surface and the second planar drive surface face one another, are oriented parallel to each other and define a first distance therebetween in a circumferential direction, the circumferential direction extending perpendicular to the longitudinal axis and perpendicular to a radial direction, the radial direction extending outward from and perpendicular to the longitudinal axis, the first concavely curved surface and the second concavely curved surface defining a second distance therebetween in the circumferential direction, the second distance being less than the first distance, wherein the first concavely curved surface is arranged farther from the longitudinal axis than the first planar drive surface in the radial direction, and the second concavely curved surface is arranged farther from the longitudinal axis than the second planar drive surface in the radial direction, and wherein a spacing between the first concavely curved surface and the second concavely curved surface in a direction parallel to the circumferential direction decreases with increasing radial distance from the longitudinal axis, thereby resulting in a tapering configuration with increasing radial distance from the longitudinal axis.

8. The dental prosthesis as claimed in claim 7, wherein the first planar drive surface and the second planar drive surface are oriented parallel to the longitudinal axis.

9. The dental prosthesis as claimed in claim 7, wherein the recess is arranged at a lower free end of the extension and is open toward the lower free end.

10. The dental prosthesis as claimed in claim 7, wherein the recess is a tunnel-like recess.

11. The dental prosthesis as claimed in claim 7, wherein the recess extends in the radial direction orthogonally to the longitudinal axis.

12. A dental prosthesis, comprising:

a dental implant;

a superstructure; and a fastening element configured to fasten the superstructure to the dental implant, the superstructure comprising an opening extending along a central longitudinal axis of the superstructure and having an interface for fixing the superstructure to the dental implant, wherein the interface comprises an extension that is arranged on a lower side of the superstructure, surrounds the opening and has a lateral surface which forms an outer side of the extension, wherein the lateral surface is interrupted by a recess which leads into the opening, wherein the recess has two mutually opposite side flanks which, in a cross section oriented orthogonally with respect to the longitudinal axis, are at a first distance from each other in a first region and, in a second region which is at a greater distance from the longitudinal axis than the first region, are at a second distance from each other, the second distance being smaller than the first distance, and wherein the lateral surface is curved concavely in a longitudinal section in which the longitudinal axis lies.

* * * * *